United States Patent
Brisebois et al.

(10) Patent No.: US 10,136,396 B2
(45) Date of Patent: Nov. 20, 2018

(54) METHOD AND SYSTEM FOR NETWORK ASSISTED INTERFERENCE COORDINATION AND MITIGATION

(71) Applicant: AT&T Mobility II LLC, Atlanta, GA (US)

(72) Inventors: Arthur Brisebois, Cumming, GA (US); Ye Chen, Milton, GA (US); Yonghui Tong, Alpharetta, GA (US)

(73) Assignee: AT&T MOBILITY II LLC, Atlanta, GA (US)

( * ) Notice: Subject to any disclaimer, the term of this patent is extended or adjusted under 35 U.S.C. 154(b) by 51 days.

(21) Appl. No.: 14/501,620

(22) Filed: Sep. 30, 2014

(65) Prior Publication Data
US 2016/0095070 A1   Mar. 31, 2016

(51) Int. Cl.
*H04L 5/00* (2006.01)
*H04W 52/44* (2009.01)
(Continued)

(52) U.S. Cl.
CPC ......... *H04W 52/242* (2013.01); *H04W 24/08* (2013.01); *H04W 72/0406* (2013.01);
(Continued)

(58) Field of Classification Search
CPC ........... H04W 52/242; H04W 72/1289; H04W 36/0016
(Continued)

(56) References Cited

U.S. PATENT DOCUMENTS

| 9,007,926 B2* | 4/2015 | Hou | H04W 52/12 370/252 |
| 2003/0063579 A1* | 4/2003 | Lee | H04W 68/00 370/312 |

(Continued)

FOREIGN PATENT DOCUMENTS

| EP | 2768268 A1 | 8/2014 |
| WO | 2010105231 A1 | 9/2010 |
| WO | 2011100653 A1 | 8/2011 |

OTHER PUBLICATIONS

"International Preliminary Report on Patentabiity", PCT/US2015/052552, Apr. 13, 2017, pp. 1-8.
(Continued)

*Primary Examiner* — Asad Nawaz
*Assistant Examiner* — Jason Harley
(74) *Attorney, Agent, or Firm* — Guntin & Gust, PLC; Matthew Tropper

(57) ABSTRACT

Aspects of the subject disclosure may include, for example, a system that obtains uplink parameters associated with different sectors of a wireless network where the uplink parameters are associated with uplink transmissions of a first end user device. The system can determine a differential path loss for the first end user device based on the uplink parameters where the differential path loss is between the different sectors of the wireless network. The system, responsive to a determination that the differential path loss does not satisfy a differential path loss threshold, can determine a restriction for utilization of a particular frequency and power level over a particular time period, where the determination that the differential path loss does not satisfy the differential path loss threshold can be performed without utilizing channel quality data from the first end user device. Other embodiments are disclosed.

20 Claims, 6 Drawing Sheets

(51) Int. Cl.
  *H04W 40/00* (2009.01)
  *H04L 12/26* (2006.01)
  *H04W 52/24* (2009.01)
  *H04W 24/08* (2009.01)
  *H04W 72/04* (2009.01)
  *H04W 72/08* (2009.01)
  *H04W 24/10* (2009.01)

(52) U.S. Cl.
  CPC .......... *H04W 72/085* (2013.01); *H04W 24/10* (2013.01); *H04W 72/0426* (2013.01); *H04W 72/0453* (2013.01)

(58) Field of Classification Search
  USPC .......................................... 455/436; 370/252
  See application file for complete search history.

(56) References Cited

U.S. PATENT DOCUMENTS

| | | | |
|---|---|---|---|
| 2006/0126546 A1* | 6/2006 | Lee | H04B 7/2615 370/310 |
| 2006/0159004 A1* | 7/2006 | Ji | H04W 16/04 370/208 |
| 2007/0254650 A1* | 11/2007 | Noguchi | H04W 60/02 455/435.1 |
| 2009/0080382 A1* | 3/2009 | Chen | H04W 36/0016 370/331 |
| 2009/0093252 A1* | 4/2009 | Czaja | H04W 52/343 455/436 |
| 2009/0137241 A1* | 5/2009 | Yavuz | H04W 74/04 455/423 |
| 2009/0207803 A1* | 8/2009 | Kawamura | H04W 72/085 370/330 |
| 2010/0159936 A1 | 6/2010 | Brisebois et al. | |
| 2014/0073343 A1 | 3/2014 | Chevallier et al. | |
| 2014/0080493 A1* | 3/2014 | Baumgartner | H04W 52/0206 455/450 |
| 2014/0321406 A1* | 10/2014 | Marinier | H04B 7/024 370/329 |

OTHER PUBLICATIONS

"International Search Report", PCT/US2015/052552, Jan. 8, 2016, pp. 1-6.
"Written Opinion of the International Searching Authority", PCT/US2015/052552, Jan. 8, 2016, pp. 1-7.

* cited by examiner

200

300

400

METHOD AND SYSTEM FOR NETWORK ASSISTED INTERFERENCE COORDINATION AND MITIGATION

FIELD OF THE DISCLOSURE

The subject disclosure relates to a network-based method and system for mitigating interference in wireless communications.

BACKGROUND

Interference collisions in wireless communications can degrade the quality of service for a user. As more users utilize wireless communications, these potential problems increase. Current interference mitigation techniques are suited for latency-insensitive and bandwidth-rich best effort data applications.

BRIEF DESCRIPTION OF THE DRAWINGS

Reference will now be made to the accompanying drawings, which are not necessarily drawn to scale, and wherein.

DETAILED DESCRIPTION

Figure 1:
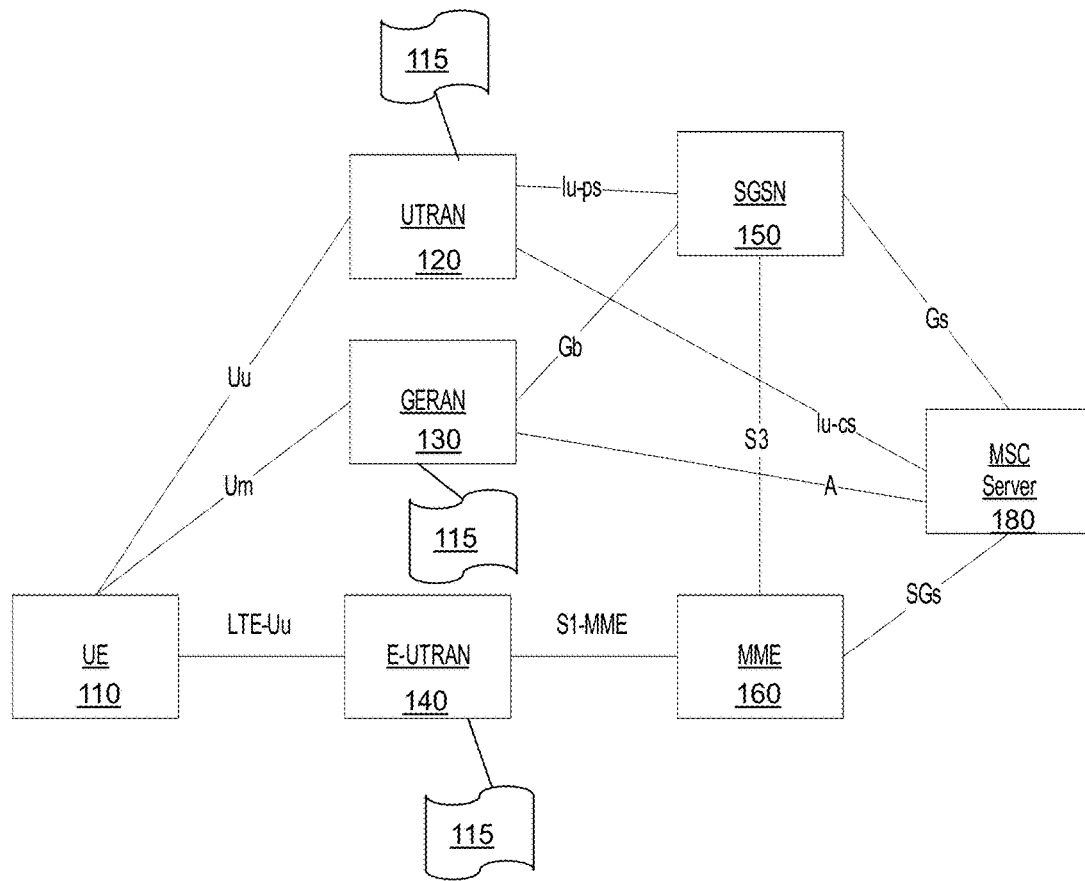
FIG. 1 depicts an illustrative embodiment of a wireless communication system that implements interference mitigation via uplink monitoring.

The subject disclosure describes, among other things, illustrative embodiments for wireless network mitigation of interference through prediction or estimation of the interference based upon monitored uplink transmissions. Differential path loss between different sectors of the same cell site and/or different cell sites can be determined based on uplink parameters. A threshold can be utilized for the prediction or estimation of the interference. In one embodiment, if interference is predicted or estimated then interference coordination can be performed for the downlink communications, such as reserving or limiting use of a particular frequency (e.g., a Physical Resource Block (PRB)) over a particular time period (e.g., a Transmission Time Interval (TTI)). The interference coordination can be performed without utilizing channel quality data (such as Channel Quality Indication (CQI) reporting) from end user devices.

One or more aspects of the subject disclosure include network performed or assisted interference coordination by which channelized downlink interference can be selectively and efficiently reduced or minimized without utilizing channelized quality reporting from a victim end user device and/or from other end user devices. In one or more embodiments, the combination of network uplink measurements and downlink scheduling techniques can be utilized to provide targeted interference avoidance. In one or more embodiments, the interference coordination can be applied to protect bandwidth limited, yet jitter sensitive, communications (e.g., voice calls) by tuning the frequency and/or time allocation choices, such as for best effort data calls. The exemplary embodiments can be applied to various wireless access systems and protocols, including wireless communications in the licensed and unlicensed spectrum.

One embodiment of the subject disclosure is a method that includes obtaining, by a system including a processor, uplink parameters including measurements associated with uplink transmissions of a first end user device. The system can determine a differential path loss for the first end user device based on the uplink parameters, where the differential path loss is between different sectors of a cellular network, and where the different sectors include a serving sector and a neighboring sector. The differential path loss can be compared to a path loss threshold. The system can, responsive to a determination that the differential path loss does not satisfy the path loss threshold, provide a message to equipment of the neighboring sector, where the message identifies a restriction for utilization of a particular frequency over a particular time period. The providing of the message can cause the equipment of the neighboring sector to apply the restriction to communications of a second end user device. The determination that the differential path loss does not satisfy the path loss threshold can be performed without utilizing channel quality data from the first end user device.

One embodiment of the subject disclosure includes a machine-readable storage device, including executable instructions that, when executed by a processor of a serving sector of a cellular network, facilitate performance of operations. The operations include obtaining uplink parameters from equipment of a neighboring sector of the cellular network, where the uplink parameters include measurements associated with uplink transmissions of a first end user device. The operations include determining a differential path loss for the first end user device based on the uplink parameters, where the differential path loss is between different sectors of the cellular network including the serving sector and the neighboring sector. The operations include, responsive to a determination that the differential path loss does not satisfy a path loss threshold, determining a restriction for utilization of a particular frequency over a particular time period. The particular frequency and the particular time period can be utilized in providing a communication service to the first end user device. The equipment of the neighboring sector can apply the restriction to communications of a second end user device. The determination that the differential path loss does not satisfy the path loss threshold can be performed without utilizing channel quality data from the first end user device.

One embodiment of the subject disclosure includes a system having a processor and a memory that stores executable instructions that, when executed by the processor, facilitate performance of operations. The operations include obtaining uplink parameters associated with different sectors of a cellular network, where the uplink parameters are associated with uplink transmissions of a first end user device. The operations include determining a differential path loss for the first end user device based on the uplink parameters, where the differential path loss is between the different sectors of the cellular network. The operations include, responsive to a determination that the differential path loss does not satisfy a path loss threshold, determining a restriction for utilization of a particular frequency over a particular time period. The particular frequency and the particular time period can be utilized by equipment of a serving sector of the different sectors in providing a communication service to the first end user device. Equipment of a neighboring sector of the different sectors can apply the restriction to communications of a second end user device. The determination that the differential path loss does not satisfy the path loss threshold can be performed without utilizing channel quality data from the first end user device.

FIG. 1 depicts an illustrative embodiment of a wireless or mobile communication system 100 that can provide communication services, including voice, video, data and/or messaging services to communication devices including mobile devices, such as end user device 110. System 100 can enable communication services over a number of different networks, such as between end user device 110 and another communication device (e.g., a second end user device) not shown. End user device 110 can be a number of different types of devices that are capable of voice, video, data and/or messaging communications utilizing a wireless connection, including a mobile device (e.g., a smartphone), a personal computer, a set top box, and so forth.

System 100 can include one or more of a Universal Terrestrial Radio Access Network (UTRAN) 120, a Global System for Mobile communications (GSM) Enhanced Data rates for GSM Evolution (EDGE) Radio Access Network 130 (herein referred to as GERAN 130), and an E-UTRAN 140. The system 100 can further include one or more of a Serving General packet radio service (GPRS) Support Node (SGSN) 150, a Mobility Management Entity (MME) 160 and Mobile Switching Center (MSC) 180.

UTRAN 120, GERAN 130 and/or E-UTRAN 140 can include computer instructions and/or hardware to perform uplink transmission monitoring and interference coordination functions 115. The monitoring and coordination functions 115 can include monitoring uplink transmission of end user devices. For instance, uplink parameters (such as measurements) associated with different sectors, such as a serving sector and one or more non-serving sectors (referred to as neighboring sectors) of a cellular network, can be obtained. The use of the term neighboring sector refers to a sector that can potentially interfere with communications of a serving sector. The neighboring sector can be in a same cell site or in a different cell site. The neighboring sector can be adjacent to the serving sector or can be a non-adjacent sector. The monitoring and coordination functions 115 can include determining a differential path loss for a particular end user device based on the uplink parameters, where the differential path loss is between the different sectors of the cellular network.

The monitoring and coordination functions 115 can include determining a restriction to be placed on or otherwise associated with utilization of a particular frequency over a particular time period responsive to a determination that the differential path loss does not satisfy a path loss threshold. The particular frequency and the particular time period can be utilized by equipment of a serving sector of the different sectors in providing a communication service to the particular end user device 110. Equipment of a neighboring sector of the different sectors can apply the restriction to communications of another end user device(s) (not shown). In one or more embodiments, the determination that the differential path loss does not satisfy the path loss threshold can be performed without utilizing channel quality data from the particular end user device.

In one embodiment, the monitoring and coordination functions 115 can include providing a message to the equipment of the neighboring sector(s), where the message identifies the restriction to be placed on utilization of the particular frequency over the particular time period by the neighboring sector(s). The providing of the message can cause the equipment of the neighboring sector to apply the restriction for the communications of the other end user device. The restriction can limit an amount of power applied by the equipment of the neighboring sector with respect to the particular frequency over the particular time period for the communications of the other end user device. In another embodiment, the monitoring and coordination functions 115 can include providing a message to the equipment of the neighboring sector, where the message identifies the restriction for the utilization of the particular frequency over the particular time period, where the providing of the message causes the equipment of the neighboring sector to apply the restriction for the communications of the other end user device, and where the restriction prohibits the equipment of the neighboring sector from utilizing the particular frequency over the particular time period for the communications of the other end user device.

In one or more embodiments, system 100 can provide for circuit switching fallback for packet switching so as to enable the provisioning of voice and other circuit switching-domain services (e.g., circuit switching UDI video/LCS/USSD) by reuse of circuit switching infrastructure, such as when the end-user device 110 is served by E-UTRAN 140. In one or more embodiments, a circuit-switching fallback enabled terminal (e.g., end user device 110) connected to E-UTRAN 140 may use GERAN 130 or UTRAN 120 to connect to the circuit switching-domain. In one or more embodiments, the circuit switching fallback and Internet protocol Multimedia Subsystem (IMS)-based services of system 100 can co-exist in a single service operator's network.

In one or more embodiments, UTRAN 120 can include node B's and radio network controllers which enable carrying many traffic types including real-time circuit-switched to IP-based packet switched traffic. In one or more embodiments the monitoring and coordination functions 115 can be performed by equipment of the node B's. The UTRAN 120 can also enable connectivity between the end user device 110 and the core network. The UTRAN 120 can utilize a number of interfaces including Iu, Uu, Iub and/or Iur. For example, the Iu interface can be an external interface that connects the radio network controllers to the core network. The Uu can be an external interface that connects a node B with the end user device 110. The Iub can be an internal interface connecting the remote network controllers with the node B. The Iur interface can be an internal interface and/or external interface for connecting multiple remote network controllers.

In one or more embodiments, GERAN 130 can facilitate communications between base stations (e.g., Ater and Abis interfaces) and base station controllers (e.g., A interfaces).

In one or more embodiments, E-UTRAN 140 can be the air interface for a Long Term Evolution (LTE) upgrade path for mobile networks according to the 3GPP specification. E-UTRAN 140 can include enodeBs (eNBs) on the network that are connected to each other such as via an X2 interface, which are connectable to the packet switch core network via an S1 interface. For example, E-UTRAN 140 can use various communication techniques including orthogonal frequency-division multiplexing (OFDM), multiple-input multiple-output (MIMO) antenna technology depending on the capabilities of the terminal, and/or beamforming for downlink to support more users, higher data rates and lower processing power required on each handset. In one or more embodiments the monitoring and coordination functions 115 can be performed by equipment of the eNB's.

In one or more embodiments, the SGSN 150 can assume responsibility for delivery of data packets from and to mobile stations within the SGSN's geographical service or coverage area. The SGSN 150 can perform functions including packet routing and transfer, mobility management (e.g., attach/detach and location management), logical link management, and/or authentication and charging functions. In one or more embodiments, a location register of the SGSN 150 can store location information (e.g., current cell) and user profiles (e.g., addresses used in the packet data network) of users registered with the SGSN.

In one or more embodiments, the MME 160 can perform the function of a control-node. For example, the MME 160 can perform functions such as idle mode tracking and paging procedure including retransmissions. The MME 160 can also choose a serving gateway for the end user device 110 such as at the initial attach and at time of intra-LTE handover involving node relocation.

In one or more embodiments, the MSC 180 can perform functions including routing voice calls and Short-Message Service (SMS), as well as other services (e.g., conference calls, FAX and circuit switched data) via setting up and releasing end-to-end connections, handling mobility and hand-over requirements during the communications, and/or performing charging and real time pre-paid account monitoring.

Figure 2:
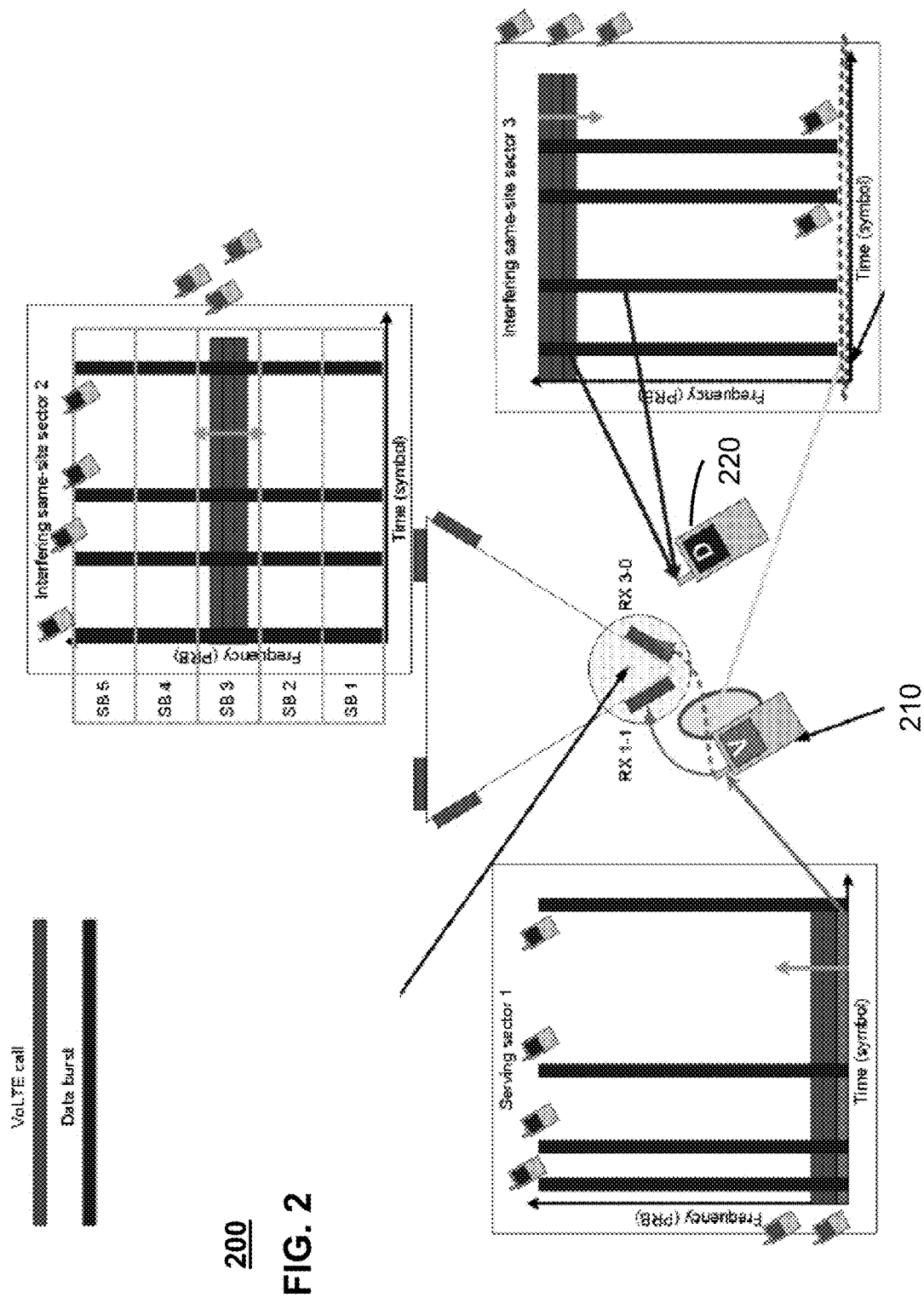
FIG. 2 depicts an illustrative embodiment of another wireless communication system that implements interference mitigation via uplink monitoring.

FIG. 2 depicts an illustrative embodiment of a system 200 that can monitor uplink transmissions and provide interference coordination for wireless communication sessions of one or more end user devices. System 200 can utilize a combination of uplink measurement mechanisms (e.g., measurements already being collected) and scheduler coordination to enable interference avoidance with less performance reporting (e.g., CQI reporting) overhead and resource waste. In one embodiment, system 200 can utilize a semi-persistent PRB and TTI scheduling for particular communication sessions (e.g., VoLTE calls). In this example, while being served by a sector carrier, the end user device 210 can be allocated a consistent PRB and TTI per downlink Adaptive Multi-Rate (AMR) packet burst. For example, this semi-persistent allocation can minimize the interference coordination signaling and processing overhead. System 200 can aggregate and combine single-user uplink reception from multiple sector carriers, similar to uplink soft handovers for Universal Mobile Telecommunications (UMTS) voice calls. For instance, the aggregation and combination can be performed by LTE eNB scheduler(s). However, system 200 is applicable to various types of communication protocols, which may or may not be LTE communications.

System 200 can be applied to jitter-sensitive services (e.g., VoLTE QCI1). System 200 can utilize the uplink information (e.g., a received signal strength indicator (RSSI) from the various eNB sector carriers receiving transmissions from a single end user device) to determine the differential path loss between serving and interfering (e.g., neighboring) cells and each end user device. A threshold can be applied for differential path loss to trigger interference coordination. For example, the threshold can be applied to a differential uplink path loss (between end user device and two or more different sector carriers); below which downlink interference coordination is implemented. The interference coordination can include coordinating downlink PRB reuse between the sector carrier serving a specific communication session (e.g., a VoLTE call) and the sector carrier(s) associated with the failing to satisfy the threshold which are also attempting to reuse the same PRB for other end user devices. This example is described with respect to a VoLTE call, however, the particular frequency and/or time resource being reserved or otherwise limited can be based on various communication protocols.

In one embodiment, the sector carrier serving the VoLTE call (or other communication session) can inform the identified interfering sector carrier that PRB "x" is reserved for "y" TTI. This notification can be internal for co-cell site interference or over an X2 interface for inter-cell site interference. In one or more embodiments, the PRB and TTI allocations for the particular end user communication sessions can be semi-persistent, so the coordination overhead would be relatively low. For instance in one embodiment, this coordination message can be sent to interfering sectors as soon as the end user device is within the threshold and can be cancelled as soon as the end user device session is beyond the threshold. In one embodiment, if the neighboring sector is within the threshold and interference coordination has begun, then the interfering sector can be prevented from assigning or otherwise instructed not to assign the PRB for the TTI specified by the serving sector.

System 200 can utilize a relative path loss detection process. For example, eNB receivers can detect uplink transmissions from served and unserved end user devices. These uplink received signals may already be monitored by the network for a variety of other purposes including uplink diversity reception combining, coordinated uplink multipoint reception, uplink scheduling, and so forth. The uplink measurement can be of various types, such as RSSI, SRS symbol strength, and so forth. In one or more embodiments, the type of measurement process(es) utilized is selected based in part on its ability to capture data that enables differentiating one end user device from another end user device. When compared, the uplink signal strength measurements can be a useful indication of relative path loss and probability of interference for that specific end user device location. For example, if a VoLTE call is mid-point between two sectors of the same cell site, the uplink transmissions would likely be received at a similar signal strength at both sectors, thus resulting in a low relative path loss. Downlink transmissions can use the same path in the opposite direction so a low uplink relative path loss can indicate a higher probability of downlink interference between both sectors if transmitting at the same frequencies and at the same time.

Some communication services and quality of service classes that use non-amplitude modulation schemes (e.g., Quadrature Phase Shift Keying (QPSK)) may utilize downlink power control. In this example, link adaptation can be bundled in the interference coordination process. For instance, if interference coordination indicates not to use PRB "X" during TTI "Z", a link adaptation (e.g., power control="Y") component can also be included that indicates not to use PRB "X" above power "Y" during TTI "Z". For example, the calculation of maximum allowable power can be based upon the difference between the actual relative path loss and the relative path loss for interference coordination threshold. In one embodiment, if the relative path loss is 4 dB below the threshold then the interfering cell can use the same PRB and TTI only if the downlink power is attenuated 4 dB or more. Other amounts of power limitations can also be applied. This can allow some limited cell-center VoLTE use of PRB and TTI that would otherwise be completely reserved. This can also add an incremental level of interference coordination efficiency.

In one embodiment, interference coordination notification can be provided from the serving sector carrier to the interfering sector carrier. For example, the serving sector carrier can receive the uplink measurements from multiple sector carriers that detect the VoLTE UE uplink transmissions. If the other sector carriers are at the same cell site and connected to the same baseband unit processor these measurements can be exchanged within the baseband unit processor. If the other sector carriers are at different cell sites, the uplink measurements can be sent to the serving eNB over the X2 interface. The serving sector carrier can calculate relative path loss for each served VoLTE end user device and detected sector carrier combination. In one embodiment, if the relative path loss is above a threshold, the probability of interference can be considered to be low and no coordination is implemented. If the relative path loss for a specific VoLTE end user device and interfering sector carrier combination is below the threshold then the probability of interference can be considered to be high. In this scenario, the serving sector carrier can perform one or more of the following interference coordination processes: allocate to the VoLTE end user device a persistent PRB and TTI combination or a pre-defined frequency hopping pattern position; and send an interference coordination message or order to the interfering sector carrier. The coordination message can include one or more of the following: an end user device-specific designation; reserved PRB or the reserved end user device position on a pre-defined PRB frequency hopping pattern; reserved TTI; or maximum allowable power for interfering cell use with power-controlled services and MCS classes.

The interfering sector(s) with a relative path loss below the threshold can then engage in interference coordination compliance pursuant to the interference message and an interference coordination plan (e.g., reserved or otherwise limited frequency and time allocations). For example, upon receipt of the interference coordination notification from the serving sector carrier (within the baseband unit processor or over the X2 interface) the interfering sector carrier will not assign (or otherwise enable transmissions using) the specified PRB and TTI combination for any served end user device of any service class above the maximum allowable power limit. The same PRB may be reused for other end user devices in other TTI outside of the TTI described in the received interference coordination notification thus minimizing data performance reduction to a narrow PRB and TTI combination specified in the interference coordination notification only. If no interference coordination notification is received, the sector carrier may use and transmit all PRB over all TTI at full power if desired or needed.

In one or more embodiments, interference coordination can be cancelled, such as based on a message from the serving sector carrier. Interference coordination can be removed or otherwise cancelled for a number of reasons including the relative path loss increasing above the interference coordination threshold; the end user device moving to a new location and the relative path loss being above the interference coordination threshold at this new location; an end of the communication session for the end user device, a dynamic change to the threshold, and so forth. If the interference coordination is to be withdrawn, the serving sector carrier can send an end user device-specific interference coordination cancel message to the interfering sector carrier(s). Upon receipt of this interference coordination cancel message, the interfering sector carrier(s) can reuse the PRB and TTI combination at any power for other end user devices.

System 200 illustrates a particular example of interference coordination for same cell coordination for a VoLTE call utilizing a combination of a start index offset and the network assisted interference coordination. System 200 and the other embodiments described herein can be applied to various types of communication sessions that are established utilizing various types of communication protocols which may or may not be VoLTE calls. System 200 can also be applied to interference coordination utilizing different eNBs, where the X2 interface can be used for communicating between the eNBs.

In FIG. 2, receivers for sector 1 and sector 3 detect similar uplink RX signal from the end user device 210 during the VoLTE call. Since the relative path loss has crossed below the threshold in this scenario, network assisted interference coordination between sectors 1 and 3 can be implemented. In one embodiment, sector 1 sends an interference coordination start message to sector containing the PRB and TTI assigned to the VoLTE end user device. This message can also include a maximum allowable power when power-controlled services are supported by the interfering cell. Since this particular example is of same cell site interference, the message exchange is internal to the baseband unit processor which is managing sectors 1 and 3. Upon receipt of the interference coordination start message from sector 1, sector 3 will not allocate the same PRB at the same TTI above the maximum allowable power limit as the sector 1 call for other end user devices, such as end user device 220. This frequency and time reservation can be for the single PRB for a specific TTI and only as long as a relative path loss is determined to be below the threshold for the communication session of end user device 210.

The particular example shown in FIG. 2 is a full-power example. System 200 can allow for some reuse of the reserved PRB and TTI combination for reduced power services in the interfering cell.

In one or more embodiment, system 200 can also include start index offsetting in combination with the network-assisted interference coordination. For example, VoLTE calls can be allocated to different portions of available spectrum in different sectors while allowing use of all (or a portion) of the available spectrum for interfering data services. This can reduce the probability of interference between VoLTE calls.

System 200 can perform network-assisted interference mitigation for any number of interfering sectors, where the sectors can be located in a same cell site and/or in different cell sites. System 200 describes equipment of the serving sector (such as a baseband processor of an eNB) receiving the uplink parameters, determining the differential path loss, and determining whether the threshold has been satisfied. In one or more embodiments, one or more other devices can also perform any of the monitoring and interference coordination functions 115.

Figure 3:
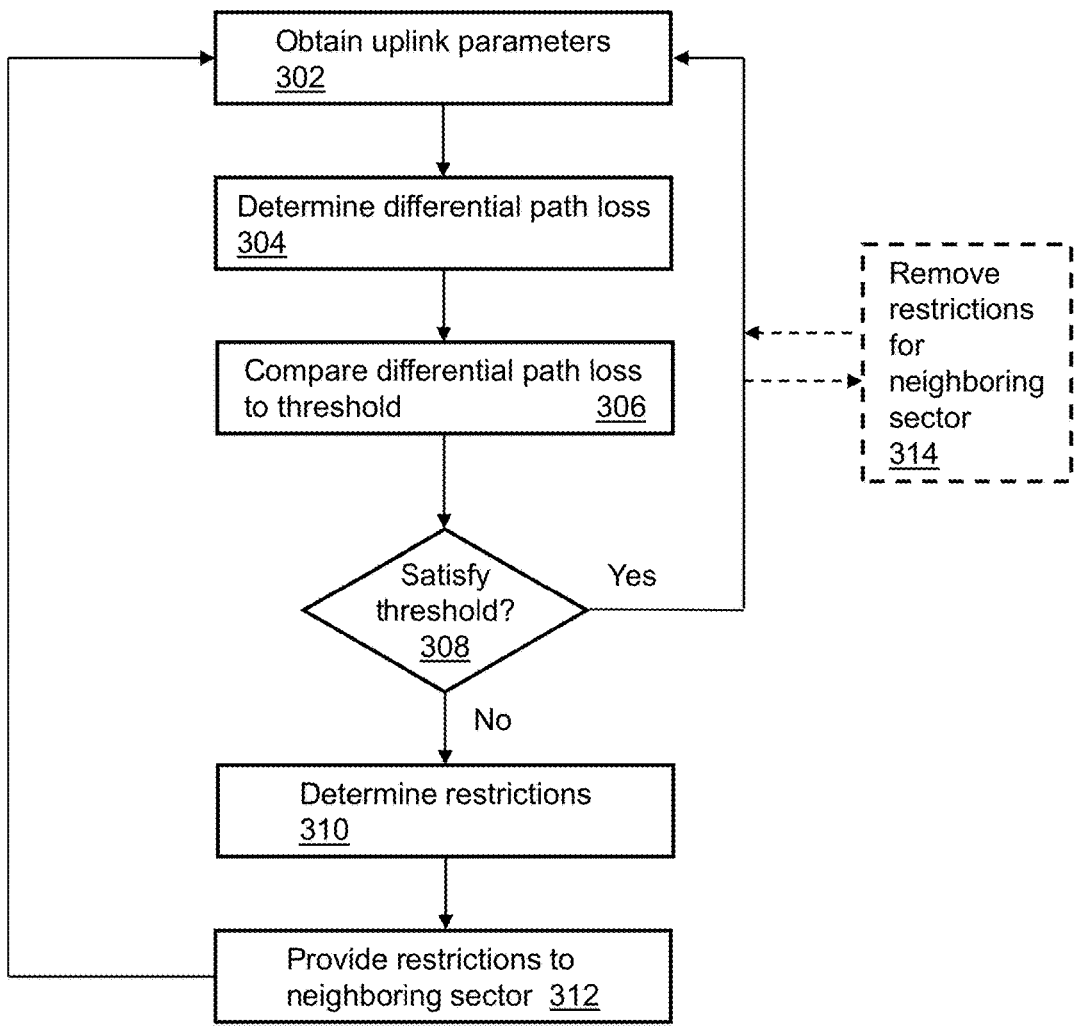
FIG. 3 depicts an illustrative embodiment of a method used in portions of the systems described in FIGS. 1 and 2.

FIG. 3 depicts an illustrative embodiment of a method 300 that can be used by system 200 to mitigate interference in wireless communications. Method 300 can be applied to various types of wireless communications which utilize various wireless access protocols including GSM, Code Division Multiple Access or CDMA, Time Division Multiple Access or TDMA, UMTS, World interoperability for Microwave or WiMAX, Software Defined Radio or SDR, LTE, and so forth. Method 300 can begin at 302 where a system obtains uplink parameters associated with uplink transmissions of a first end user device. The uplink parameters can be various parameters or combinations of parameters including measurements associated with the uplink transmissions, RSSI, SRS symbol strength and so forth. The type of uplink parameters that are obtained can be selected based on their ability to facilitate distinguishing one end user device from another end user device.

The uplink parameters can be collected or otherwise obtained by various devices, such as eNB receivers in serving and non-serving (e.g., neighboring) sectors. In one or more embodiments, the eNB for the serving sector for the first end user device can receive the uplink parameters from other eNBs (at different cell site(s)), such as over the X2 interface. In another embodiment, if the other neighboring sector(s) are at the same cell site as the serving sector (and connected to the same baseband unit) then these uplink parameters can be exchanged within the baseband unit processor.

At 304, the eNB of the serving sector can utilize the received uplink parameters in conjunction with the uplink parameters that it has measured or otherwise determined for the first end user device, to determine a differential path loss associated with the first end user device and the different sectors. The determination of the differential path loss can include calculating relative path loss data for each served end user device and detected sector carrier combination.

At 306, a comparison can be performed between the differential path loss and a path loss threshold to predict or otherwise estimate interference. For instance, if the relative path loss data is above the threshold the probability of interference may be low and interference coordination may not be implemented. If the relative path loss data for a specific combination of end user device and interfering sector carrier is below the threshold then interference is likely and interference coordination can be performed. As an example, if a voice call is mid-point between two sectors of the same cell site, the uplink transmissions should be received at a similar signal strength at both sectors which results in a low relative path loss. Downlink transmissions can use the same path in the opposite direction so a low uplink relative path loss can indicate a higher probability of downlink interference between both sectors (e.g., if transmitting at the same frequencies and at the same time.)

At 308, a determination is made (e.g., by equipment of the serving sector) as to whether the threshold has been satisfied. Responsive to a determination that the threshold has been satisfied, method 302 can return to monitoring uplink parameters at 302. Responsive to a determination that the differential path loss does not satisfy the path loss threshold, restrictions for mitigating interference can be determined at 310.

For example, the restriction can limit an amount of power applied by equipment of a neighboring sector(s) with respect to a particular frequency over a particular time period for the communications of the second end user device. In this example, the first end user device can be provided with a communication service (e.g., voice, data, and/or video) by the serving sector utilizing the particular frequency over the particular time period. As another example, the restriction can prohibit the equipment of the neighboring sector from utilizing the particular frequency over the particular time period for the communications of the second end user device. The restriction can be temporary and can be removed based on various factors such as one of the differential path loss (as determined from subsequent uplink monitoring) satisfying the threshold, a handover between different sectors, a termination of the communication session for the first end user device, and so forth.

In one embodiment at 312, an interference coordination message can be generated by the equipment of the serving sector (e.g., an eNB processor) and can be provided to the neighboring sector(s) to cause the restriction to be applied by the neighboring sector(s). The message can identify one or more of the restriction, the particular frequency, the particular time period, the end user device and so forth. In this example, the providing of the message causes the equipment of the neighboring sector(s) to apply the restriction to communication(s) of other end user device(s). In one embodiment, the message can include one or more of an end user device-specific designation; a reserved PRB or a reserved UE position on a pre-defined PRB frequency hopping pattern; a reserved TTI; or a maximum allowable power for interfering cell use with power-controlled services and MCS classes. In one or more embodiments, method 300 can be performed in whole or in part without utilizing and/or without receiving channel quality data (e.g., a CQI report) from the first end user device. For instance, the determination that the differential path loss does not satisfy the path loss threshold can be based on the uplink parameters without utilizing channel quality data from the first end user device.

In one embodiment, once the differential path loss satisfies the threshold then at 314 the restriction being applied by the neighboring sector(s) can be removed. For instance, the equipment of the serving sector can continue monitoring the uplink parameters for the first end user device and can generate and provide a restriction removal message to the neighboring sector(s) upon a determination that the threshold is satisfied.

In one embodiment, second uplink parameters can be obtained including measurements associated with second uplink transmissions of the first end user device. A second differential path loss can be determined for the first end user device based on the second uplink parameters where the second differential path loss is between the different sectors of the cellular network. The second differential path loss can be compared to the path loss threshold. Responsive to a second determination that the second differential path loss satisfies the path loss threshold, a second message can be provided to the equipment of the neighboring sector, where the providing of the second message causes the equipment of the neighboring sector to remove the restriction for the utilization of the particular frequency over the particular time period, and where the determination that the second differential path loss satisfies the path loss threshold is performed without utilizing the channel quality data from the first end user device.

In one embodiment, the particular frequency corresponds to a physical resource block, the time period corresponds to a transmission time interval, and the communication service (e.g., a voice call) provided to the first end user device utilizes a long term evolution protocol.

In one embodiment, the uplink parameters can include received signal strength indication data that is received from the equipment of the neighboring sector. In one embodiment, the serving sector and one or more neighboring sectors are in a same cell site. In one embodiment, the serving sector and one or more neighboring sectors are in different cell sites. In one embodiment, the method can include selecting the differential path loss threshold from among a group of differential path loss thresholds according to a type of communication service. In one embodiment, the restriction applied by the equipment of the neighboring sector to the communications of the second end user device is removed responsive to a handover from the serving sector to a second serving sector of a communication service provided to the first end user device.

Method 300 provides for spectral efficiency because it can be performed without utilizing sub-band CQI reporting. In one embodiment, method 300 can result in reservation of one PRB at a time, as compared to other systems that may utilize 1-2 MHz sub-band. Method 300 can adapt interference coordination every uplink burst (e.g., 20 ms for VoLTE) using the comparison of the uplink path loss information.

The interference coordination performed by method 300 is not limited by uplink sub-band CQI reporting overhead from an end user device and the approximately 80 ms between updates for such CQI reporting. The coordination process of method 300 provides for signaling efficiency because it can be performed between eNB sector carriers and can utilize measurements from the eNB(s). In one embodiment, that uplink data can already be scheduled for collection for other purposes. The interference coordination utilizes signaling or communication within the eNB scheduler (e.g., the BBU) or over the X2 transport interface between different eNB schedulers. Method 300 is not dependent upon over the air sub-band CQI reporting from end user device(s) and the associated signaling resources required for the end user device(s) to send them.

In one embodiment, method 300 can enable dynamic downlink interference avoidance only where and when needed to protect or otherwise facilitate particular communication services (e.g., VoLTE calls) in high interference probability locations. This technique can adapt to the relatively narrow spectrum and time allocation needs of VoLTE subscribers, thus minimizing the performance impact to best effort data users sharing common resources. Method 300 can provide a technique for interference mitigation without wasteful CQI reporting overhead, lag and/or frequency granularity limitations of sub-band CQI reporting and frequency selective scheduling.

Figure 4:
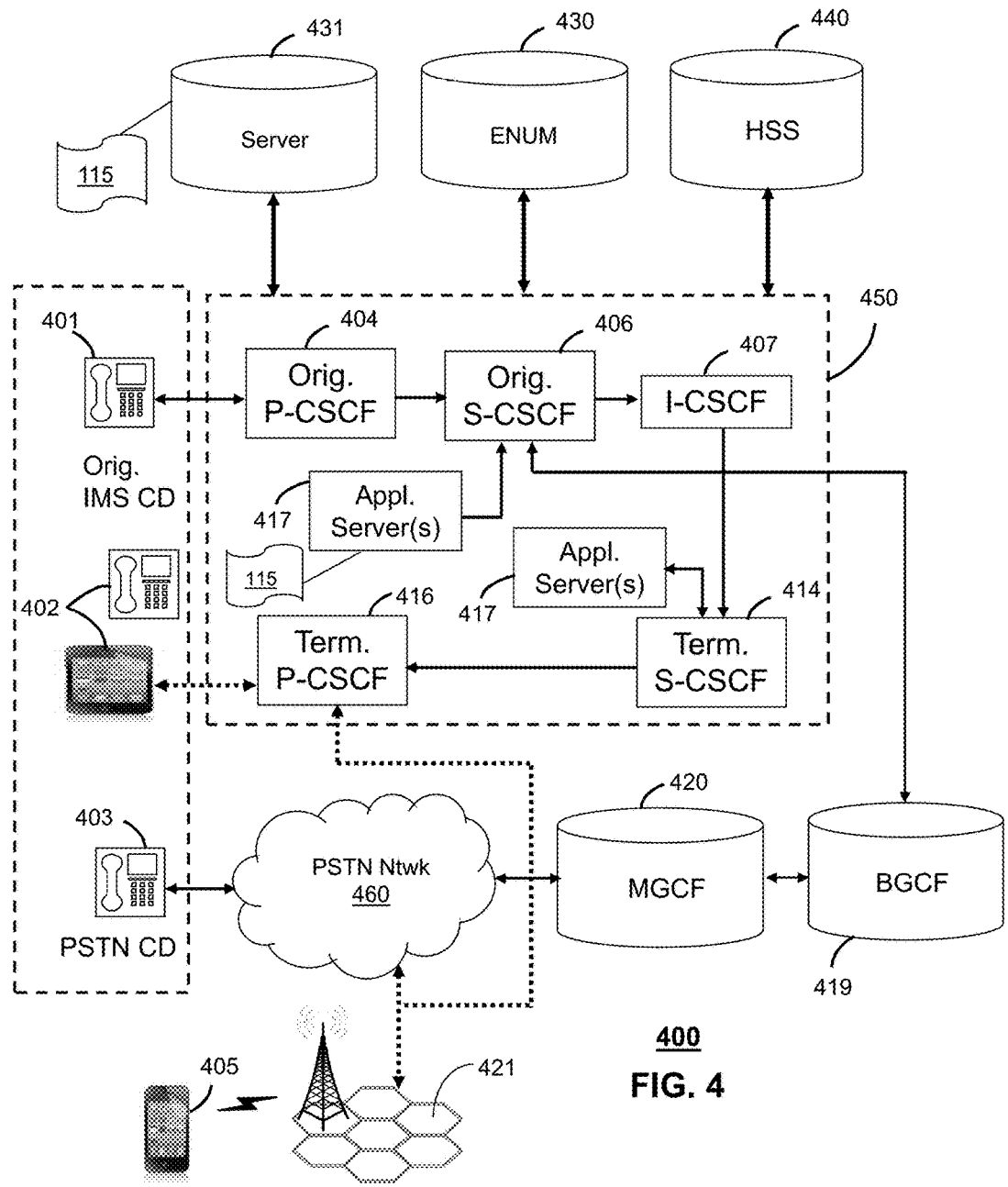
FIG. 4 depicts an illustrative embodiment of a communication system that provides communication services including interference mitigation via uplink monitoring.

FIG. 4 depicts an illustrative embodiment of a communication system 400 employing an IP Multimedia Subsystem (IMS) network architecture to facilitate the combined services of circuit-switched and packet-switched systems. Communication system 400 can be overlaid or operably coupled with systems 100 and/or 200 of FIGS. 1 and/or 2 as another representative embodiment of communication system 400.

Communication system 400 provides for monitoring of uplink transmissions and interference coordination via monitoring and coordination function 115. For example, communication system 400 enables obtaining uplink parameters from equipment of a neighboring sector(s) of a cellular network, where the uplink parameters include measurements associated with uplink transmissions of a first end user device. The system 400 enables determining a differential path loss for the first end user device based on the uplink parameters, where the differential path loss is between different sectors of the cellular network including a serving sector and the neighboring sector. The system 400 enables, responsive to a determination that the differential path loss does not satisfy a path loss threshold, determining a restriction for utilization of a particular frequency over a particular time period. The particular frequency and the particular time period can be utilized in providing a communication service to the first end user device. The equipment of the neighboring sector can apply the restriction to communications of a second end user device. The determination that the differential path loss does not satisfy the path loss threshold can be performed without utilizing channel quality data from the first end user device.

In one embodiment, the system 400 can provide an interference coordination message to the equipment of the neighboring sector, where the message identifies the restriction for the utilization of the particular frequency over the particular time period, and where the providing of the message causes the equipment of the neighboring sector to apply the restriction to the communications of the second end user device. In one embodiment, the restriction limits an amount of power applied by the equipment of the neighboring sector with respect to the particular frequency over the particular time period for the communications of the second end user device. In one embodiment, the restriction prohibits the equipment of the neighboring sector from utilizing the particular frequency over the particular time period for the communications of the second end user device. In one embodiment, the restriction for the communications of the second end user device is removed responsive to a second determination that the differential path loss satisfies the path loss threshold. In one embodiment, the serving sector and the neighboring sector are in different cell sites. In one embodiment, the serving sector and the neighboring sector are in the same cell site. In one embodiment, the particular frequency corresponds to a physical resource block, the time period corresponds to a transmission time interval, and the communication service provided to the first end user device utilizes a long term evolution protocol.

Communication system 400 can comprise a Home Subscriber Server (HSS) 440, a tElephone NUmber Mapping (ENUM) server 430, and other network elements of an IMS network 450. The IMS network 450 can establish communications between IMS-compliant communication devices (CDs) 401, 402, Public Switched Telephone Network (PSTN) CDs 403, 405, and combinations thereof by way of a Media Gateway Control Function (MGCF) 420 coupled to a PSTN network 460. The MGCF 420 need not be used when a communication session involves IMS CD to IMS CD communications. A communication session involving at least one PSTN CD may utilize the MGCF 420.

IMS CDs 401, 402 can register with the IMS network 450 by contacting a Proxy Call Session Control Function (P-CSCF) which communicates with an interrogating CSCF (I-CSCF), which in turn, communicates with a Serving CSCF (S-CSCF) to register the CDs with the HSS 440. To initiate a communication session between CDs, an originating IMS CD 401 can submit a Session Initiation Protocol (SIP INVITE) message to an originating P-CSCF 404 which communicates with a corresponding originating S-CSCF 406. The originating S-CSCF 406 can submit the SIP INVITE message to one or more application servers (ASs) 417 that can provide a variety of services to IMS subscribers.

For example, the application servers 417 can be used to perform originating call feature treatment functions on the calling party number received by the originating S-CSCF 406 in the SIP INVITE message. Originating treatment functions can include determining whether the calling party number has international calling services, call ID blocking, calling name blocking, 7-digit dialing, and/or is requesting special telephony features (e.g., *72 forward calls, *73 cancel call forwarding, *67 for caller ID blocking, and so on). Based on initial filter criteria (iFCs) in a subscriber profile associated with a CD, one or more application servers may be invoked to provide various call originating feature services.

Additionally, the originating S-CSCF 406 can submit queries to the ENUM system 430 to translate an E.164 telephone number in the SIP INVITE message to a SIP Uniform Resource Identifier (URI) if the terminating communication device is IMS-compliant. The SIP URI can be used by an Interrogating CSCF (I-CSCF) 407 to submit a query to the HSS 440 to identify a terminating S-CSCF 414 associated with a terminating IMS CD such as reference 402. Once identified, the I-CSCF 407 can submit the SIP INVITE message to the terminating S-CSCF 414. The terminating S-CSCF 414 can then identify a terminating P-CSCF 416 associated with the terminating CD 402. The P-CSCF 416 may then signal the CD 402 to establish Voice over Internet Protocol (VoIP) communication services, thereby enabling the calling and called parties to engage in voice and/or data communications. Based on the iFCs in the subscriber profile, one or more application servers may be invoked to provide various call terminating feature services, such as call forwarding, do not disturb, music tones, simultaneous ringing, sequential ringing, etc.

In some instances the aforementioned communication process is symmetrical. Accordingly, the terms "originating" and "terminating" in FIG. 4 may be interchangeable. It is further noted that communication system 400 can be adapted to support video conferencing. In addition, communication system 400 can be adapted to provide the IMS CDs 401, 402 with the multimedia and Internet services of communication system 400 of FIG. 4.

If the terminating communication device is instead a PSTN CD such as CD 403 or CD 405 (in instances where the cellular phone only supports circuit-switched voice communications), the ENUM system 430 can respond with an unsuccessful address resolution which can cause the originating S-CSCF 406 to forward the call to the MGCF 420 via a Breakout Gateway Control Function (BGCF) 419. The MGCF 420 can then initiate the call to the terminating PSTN CD over the PSTN network 460 to enable the calling and called parties to engage in voice and/or data communications.

It is further appreciated that the CDs of FIG. 4 can operate as wireline or wireless devices. For example, the CDs of FIG. 4 can be communicatively coupled to a cellular base station 421, a femtocell, a WiFi router, a Digital Enhanced Cordless Telecommunications (DECT) base unit, or another suitable wireless access unit to establish communications with the IMS network 450 of FIG. 4. The cellular access base station 421 can operate according to common wireless access protocols such as GSM, CDMA, TDMA, UMTS, WiMax, SDR, LTE, and so on. Other present and next generation wireless network technologies can be used by one or more embodiments of the subject disclosure. Accordingly, multiple wireline and wireless communication technologies can be used by the CDs of FIG. 4.

Cellular phones supporting LTE can support packet-switched voice and packet-switched data communications and thus may operate as IMS-compliant mobile devices. In this embodiment, the cellular base station 421 may communicate directly with the IMS network 450 as shown by the arrow connecting the cellular base station 421 and the P-CSCF 416.

Alternative forms of a CSCF can operate in a device, system, component, or other form of centralized or distributed hardware and/or software. Indeed, a respective CSCF may be embodied as a respective CSCF system having one or more computers or servers, either centralized or distributed, where each computer or server may be configured to perform or provide, in whole or in part, any method, step, or functionality described herein in accordance with a respective CSCF. Likewise, other functions, servers and computers described herein, including but not limited to, the HSS, the ENUM server, the BGCF, and the MGCF, can be embodied in a respective system having one or more computers or servers, either centralized or distributed, where each computer or server may be configured to perform or provide, in whole or in part, any method, step, or functionality described herein in accordance with a respective function, server, or computer.

The server 431 of FIG. 4 can be operably coupled to communication system 400 for purposes similar to those described above. Server 431 can perform function 115 and thereby provide uplink monitoring and interference coordination for the CDs 401, 402, 403 and 405 of FIG. 4. Server 431 can be a separate device, such as a processor of an eNB and/or an integral part of the application server(s) 417 performing function 115.

For illustration purposes only, the terms S-CSCF, P-CSCF, I-CSCF, and so on, can be server devices, but may be referred to in the subject disclosure without the word "server." It is also understood that any form of a CSCF server can operate in a device, system, component, or other form of centralized or distributed hardware and software. It is further noted that these terms and other terms such as DIAMETER commands are terms can include features, methodologies, and/or fields that may be described in whole or in part by standards bodies such as $3^{rd}$ Generation Partnership Project (3GPP). It is further noted that some or all embodiments of the subject disclosure may in whole or in part modify, supplement, or otherwise supersede final or proposed standards published and promulgated by 3GPP.

Figure 5:
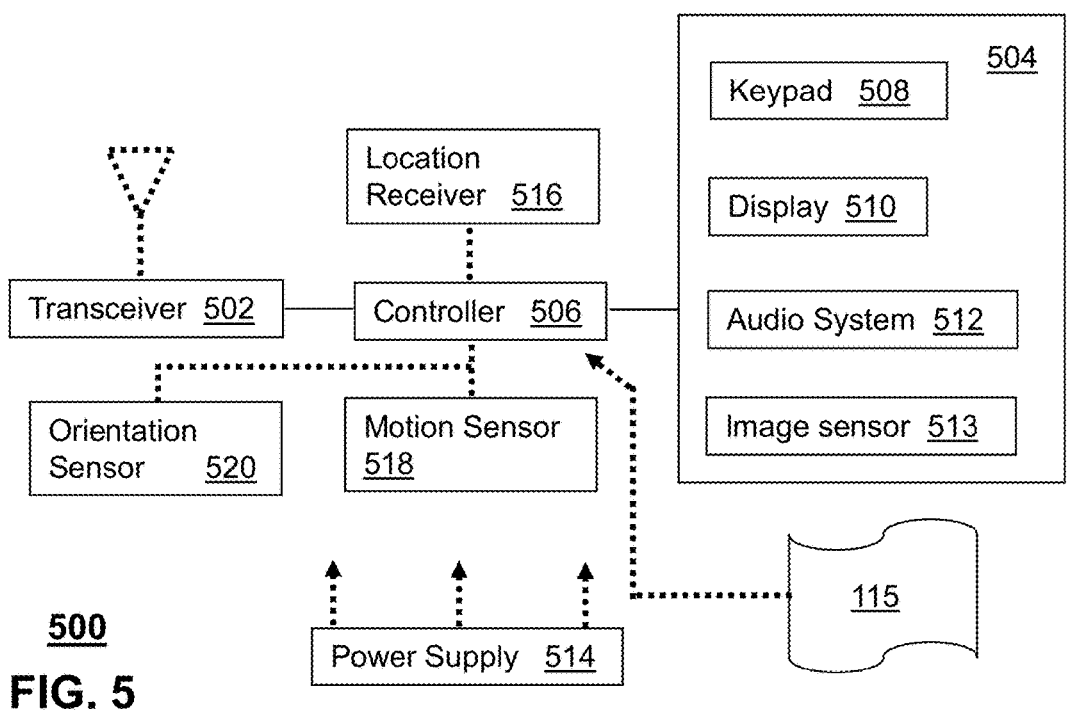
FIG. 5 depicts an illustrative embodiment of a communication device that implements or otherwise utilizes interference mitigation via uplink monitoring.

FIG. 5 depicts an illustrative embodiment of a communication device 500. Communication device 500 can serve in whole or in part as an illustrative embodiment of the devices depicted in systems 100, 200 and 400 of FIGS. 1-2 and 4, including network devices and/or end user devices. Communication device 500 in whole or in part can represent any of the communication devices described in FIGS. 1-2 and 4 and can be configured to perform all or portions of method 300 of FIG. 3.

For example, communication device 500 can be a network device that obtains uplink parameters associated with different sectors of a cellular network, where the uplink parameters are associated with uplink transmissions of a first end user device. The device 500 can determine a differential path loss for the first end user device based on the uplink parameters, where the differential path loss is between the different sectors of the cellular network. The device 500 can, responsive to a determination that the differential path loss does not satisfy a path loss threshold, determine a restriction for utilization of a particular frequency over a particular time period. The particular frequency and the particular time period can be utilized by equipment of a serving sector of the different sectors in providing a communication service to the first end user device. Equipment of a neighboring sector of the different sectors can apply the restriction to communications of a second end user device(s). The determination that the differential path loss does not satisfy the path loss threshold can be performed without utilizing channel quality data from the first end user device.

In another embodiment, communication device 500 can be an end user device that is provided with interference coordination and mitigation during a communication session through use of monitoring (by one or more network devices) of uplink transmission(s) of the device 500. The interference mitigation can be performed by the one or more network devices without the device 500 providing CQI reporting.

Communication device 500 can comprise a wireline and/or wireless transceiver 502 (herein transceiver 502), a user interface (UI) 504, a power supply 514, a location receiver 516, a motion sensor 518, an orientation sensor 520, and a controller 506 for managing operations thereof. The transceiver 502 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1x, UMTS/HSDPA, GSM/GPRS, TDMA/EDGE, EV/DO, WiMAX, SDR, LTE, as well as other next generation wireless communication technologies as they arise. The transceiver 502 can also be adapted to support circuit-switched wireline access technologies (such as PSTN), packet-switched wireline access technologies (such as TCP/IP, VoIP, etc.), and combinations thereof.

The UI 504 can include a depressible or touch-sensitive keypad 508 with a navigation mechanism such as a roller ball, a joystick, a mouse, or a navigation disk for manipulating operations of the communication device 500. The keypad 508 can be an integral part of a housing assembly of the communication device 500 or an independent device operably coupled thereto by a tethered wireline interface (such as a USB cable) or a wireless interface supporting for example Bluetooth®. The keypad 508 can represent a numeric keypad commonly used by phones, and/or a QWERTY keypad with alphanumeric keys. The UI 504 can further include a display 510 such as monochrome or color LCD (Liquid Crystal Display), OLED (Organic Light Emitting Diode) or other suitable display technology for conveying images to an end user of the communication device 500. In an embodiment where the display 510 is touch-sensitive, a portion or all of the keypad 508 can be presented by way of the display 510 with navigation features.

The display 510 can use touch screen technology to also serve as a user interface for detecting user input. As a touch screen display, the communication device 500 can be adapted to present a user interface with graphical user interface (GUI) elements that can be selected by a user with a touch of a finger. The touch screen display 510 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 510 can be an integral part of the housing assembly of the communication device 500 or an independent device communicatively coupled thereto by a tethered wireline interface (such as a cable) or a wireless interface.

The UI 504 can also include an audio system 512 that utilizes audio technology for conveying low volume audio (such as audio heard in proximity of a human ear) and high volume audio (such as speakerphone for hands free operation). The audio system 512 can further include a microphone for receiving audible signals of an end user. The audio system 512 can also be used for voice recognition applications. The UI 504 can further include an image sensor 513 such as a charged coupled device (CCD) camera for capturing still or moving images.

The power supply 514 can utilize common power management technologies such as replaceable and rechargeable batteries, supply regulation technologies, and/or charging system technologies for supplying energy to the components of the communication device 500 to facilitate long-range or short-range portable applications. Alternatively, or in combination, the charging system can utilize external power sources such as DC power supplied over a physical interface such as a USB port or other suitable tethering technologies.

The location receiver 516 can utilize location technology such as a global positioning system (GPS) receiver capable of assisted GPS for identifying a location of the communication device 500 based on signals generated by a constellation of GPS satellites, which can be used for facilitating location services such as navigation. The motion sensor 518 can utilize motion sensing technology such as an accelerometer, a gyroscope, or other suitable motion sensing technology to detect motion of the communication device 500 in three-dimensional space. The orientation sensor 520 can utilize orientation sensing technology such as a magnetometer to detect the orientation of the communication device 500 (north, south, west, and east, as well as combined orientations in degrees, minutes, or other suitable orientation metrics).

The communication device 500 can use the transceiver 502 to also determine a proximity to a cellular, WiFi, Bluetooth®, or other wireless access points by sensing techniques such as utilizing RSSI and/or signal time of arrival (TOA) or time of flight (TOF) measurements. The controller 506 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 500.

Other components not shown in FIG. 5 can be used in one or more embodiments of the subject disclosure. For instance, the communication device 500 can include a reset button (not shown). The reset button can be used to reset the controller 506 of the communication device 500. In yet another embodiment, the communication device 500 can also include a factory default setting button positioned, for example, below a small hole in a housing assembly of the communication device 500 to force the communication device 500 to re-establish factory settings. In this embodiment, a user can use a protruding object such as a pen or paper clip tip to reach into the hole and depress the default setting button. The communication device 500 can also include a slot for adding or removing an identity module such as a Subscriber Identity Module (SIM) card. SIM cards can be used for identifying subscriber services, executing programs, storing subscriber data, and so forth.

The communication device 500 as described herein can operate with more or less of the circuit components shown in FIG. 5. These variant embodiments can be used in one or more embodiments of the subject disclosure.

The communication device 500 can be adapted to perform the monitoring and coordination functions 115 described with respect to systems 100, 200 and 400.

Upon reviewing the aforementioned embodiments, it would be evident to an artisan with ordinary skill in the art that said embodiments can be modified, reduced, or enhanced without departing from the scope of the claims described below. For example, the path loss threshold can be adjusted (e.g., dynamically) according to a number of different factors, such as one or more of network conditions, historical network conditions, network traffic, historical network traffic, subscription agreements, types of communication service, types of end user devices, availability of other interference mitigation techniques, and so forth. For example, a first threshold for triggering interference mitigation and reserving frequency and time allocations can be utilized for a first set of network traffic conditions, but the threshold can be adjusted to a second threshold (e.g., triggering interference mitigation less often) according to a second set of network traffic conditions. Other embodiments can be used in the subject disclosure.

It should be understood that devices described in the exemplary embodiments can be in communication with each other via various wireless and/or wired methodologies. The methodologies can be links that are described as coupled, connected and so forth, which can include unidirectional and/or bidirectional communication over wireless paths and/or wired paths that utilize one or more of various protocols or methodologies, where the coupling and/or connection can be direct (e.g., no intervening processing device) and/or indirect (e.g., an intermediary processing device such as a router).

Figure 6:
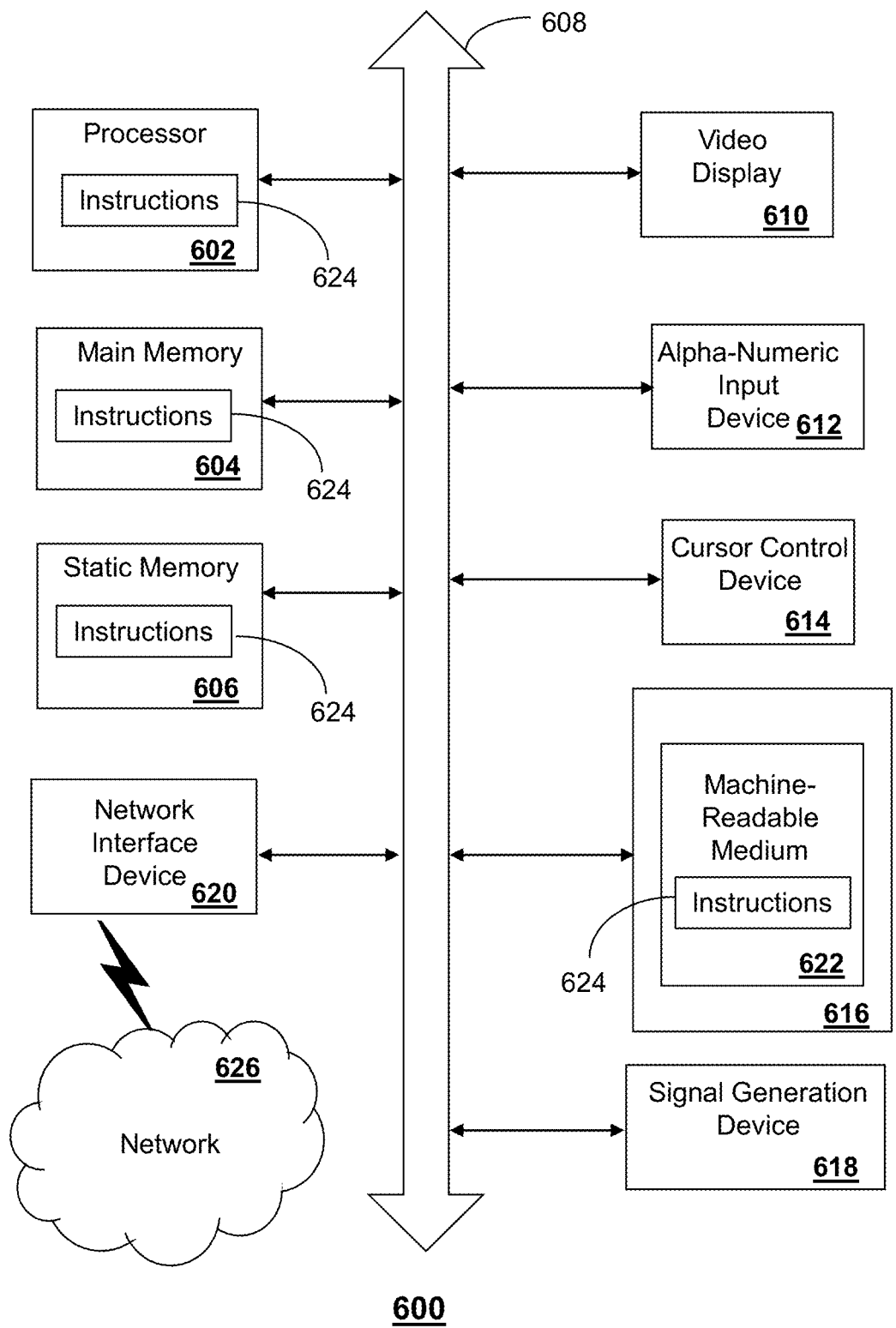
FIG. 6 is a diagrammatic representation of a machine in the form of a computer system within which a set of instructions, when executed, may cause the machine to perform any one or more of the methods described herein.

FIG. 6 depicts an exemplary diagrammatic representation of a machine in the form of a computer system 600 within which a set of instructions, when executed, may cause the machine to perform any one or more of the methods described above. One or more instances of the machine can operate, for example, as a network device for mitigating interference in wireless communications through predicting or otherwise estimating the interference based on monitoring uplink transmissions.

In some embodiments, the machine may be connected (e.g., using a network 626) to other machines. In a networked deployment, the machine may operate in the capacity of a server or a client user machine in a server-client user network environment, or as a peer machine in a peer-to-peer (or distributed) network environment.

The machine may comprise a server computer, a client user computer, a personal computer (PC), a tablet, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

The computer system 600 may include a processor (or controller) 602 (e.g., a central processing unit (CPU)), a graphics processing unit (GPU, or both), a main memory 604 and a static memory 606, which communicate with each other via a bus 608. The computer system 600 may further include a display unit 610 (e.g., a liquid crystal display (LCD), a flat panel, or a solid state display). The computer system 600 may include an input device 612 (e.g., a keyboard), a cursor control device 614 (e.g., a mouse), a disk drive unit 616, a signal generation device 618 (e.g., a speaker or remote control) and a network interface device 620. In distributed environments, the embodiments described in the subject disclosure can be adapted to utilize multiple display units 610 controlled by two or more computer systems 600. In this configuration, presentations described by the subject disclosure may in part be shown in a first of the display units 610, while the remaining portion is presented in a second of the display units 610.

The disk drive unit 616 may include a tangible computer-readable storage medium 622 on which is stored one or more sets of instructions (e.g., software 624) embodying any one or more of the methods or functions described herein, including those methods illustrated above. The instructions 624 may also reside, completely or at least partially, within the main memory 604, the static memory 606, and/or within the processor 602 during execution thereof by the computer system 600. The main memory 604 and the processor 602 also may constitute tangible computer-readable storage media.

Dedicated hardware implementations including, but not limited to, application specific integrated circuits, programmable logic arrays and other hardware devices can likewise be constructed to implement the methods described herein. Application specific integrated circuits and programmable logic array can use downloadable instructions for executing state machines and/or circuit configurations to implement embodiments of the subject disclosure. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the subject disclosure, the operations or methods described herein are intended for operation as software programs or instructions running on or executed by a computer processor or other computing device, and which may include other forms of instructions manifested as a state machine implemented with logic components in an application specific integrated circuit or field programmable gate array. Furthermore, software implementations (e.g., software programs, instructions, etc.) including, but not limited to, distributed processing or component/object distributed processing, parallel processing, or virtual machine processing can also be constructed to implement the methods described herein. It is further noted that a computing device such as a processor, a controller, a state machine or other suitable device for executing instructions to perform operations or methods may perform such operations directly or indirectly by way of one or more intermediate devices directed by the computing device.

While the tangible computer-readable storage medium 622 is shown in an example embodiment to be a single medium, the term "tangible computer-readable storage medium" should be taken to include a single medium or multiple media (e.g., a centralized or distributed database, and/or associated caches and servers) that store the one or more sets of instructions. The term "tangible computer-readable storage medium" shall also be taken to include any non-transitory medium that is capable of storing or encoding a set of instructions for execution by the machine and that cause the machine to perform any one or more of the methods of the subject disclosure. The term "non-transitory" as in a non-transitory computer-readable storage includes without limitation memories, drives, devices and anything tangible but not a signal per se.

The term "tangible computer-readable storage medium" shall accordingly be taken to include, but not be limited to: solid-state memories such as a memory card or other package that houses one or more read-only (non-volatile) memories, random access memories, or other re-writable (volatile) memories, a magneto-optical or optical medium such as a disk or tape, or other tangible media which can be used to store information. Accordingly, the disclosure is considered to include any one or more of a tangible computer-readable storage medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are from time-to-time superseded by faster or more efficient equivalents having essentially the same functions. Wireless standards for device detection (e.g., RFID), short-range communications (e.g., Bluetooth®, WiFi, Zigbee®), and long-range communications (e.g., WiMAX, GSM, CDMA, LTE) can be used by computer system 600.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. The exemplary embodiments can include combinations of features and/or steps from multiple embodiments. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

Less than all of the steps or functions described with respect to the exemplary processes or methods can also be performed in one or more of the exemplary embodiments. Further, the use of numerical terms to describe a device, component, step or function, such as first, second, third, and so forth, is not intended to describe an order or function unless expressly stated so. The use of the terms first, second, third and so forth, is generally to distinguish between devices, components, steps or functions unless expressly stated otherwise. Additionally, one or more devices or components described with respect to the exemplary embodiments can facilitate one or more functions, where the facilitating (e.g., facilitating access or facilitating establishing a connection) can include less than every step needed to perform the function or can include all of the steps needed to perform the function.

In one or more embodiments, a processor (which can include a controller or circuit) has been described that performs various functions. It should be understood that the processor can be multiple processors, which can include distributed processors or parallel processors in a single machine or multiple machines. The processor can be used in supporting a virtual processing environment. The virtual processing environment may support one or more virtual machines representing computers, servers, or other computing devices. In such virtual machines, components such as microprocessors and storage devices may be virtualized or logically represented. The processor can include a state machine, application specific integrated circuit, and/or programmable gate array including a Field PGA. In one or more embodiments, when a processor executes instructions to perform "operations", this can include the processor performing the operations directly and/or facilitating, directing, or cooperating with another device or component to perform the operations.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method, comprising:

obtaining, by a system including a processor, uplink parameters including measurements associated with uplink transmissions of a first end user device;

determining, by the system, an uplink differential path loss from transmissions of the first end user device based on the uplink parameters, wherein the transmissions are received by different sectors of a wireless network, and wherein the different sectors include a serving sector and a neighboring sector;

selecting a differential path loss threshold from among a group of path loss thresholds according to a type of a communication service for the first end user device;

comparing the uplink differential path loss to the differential path loss threshold; and responsive to a determination that the uplink differential path loss is less than the differential path loss threshold and accordingly does not satisfy the differential path loss threshold, providing, by the system, a message to equipment of the neighboring sector, wherein the message identifies a restriction for utilization by the equipment of the neighboring sector of a particular frequency over a particular time period, wherein the providing of the message causes the equipment of the neighboring sector to apply the restriction to a voice call communication of a second end user device without applying the restriction to a non-voice call communication of the second end user device, and wherein the determination that the uplink differential path loss does not satisfy the differential path loss threshold is performed without utilizing channel quality data from the first end user device.

2. The method of claim 1, further comprising:
providing, by the system, the communication service to the first end user device utilizing the particular frequency over the particular time period.

3. The method of claim 2, further comprising:
obtaining, by the system, second uplink parameters including measurements associated with second uplink transmissions of the first end user device;
determining, by the system, a second differential path loss for the first end user device based on the second uplink parameters, wherein the second differential path loss is between the different sectors of the wireless network;
comparing the second differential path loss to the differential path loss threshold; and
responsive to a second determination that the second differential path loss satisfies the differential path loss threshold, providing, by the system, a second message to the equipment of the neighboring sector,
wherein the providing of the second message causes the equipment of the neighboring sector to remove the restriction for the utilization of the particular frequency over the particular time period, and
wherein the determination that the second differential path loss satisfies the differential path loss threshold is performed without utilizing the channel quality data from the first end user device.

4. The method of claim 2, wherein the particular frequency corresponds to a physical resource block, wherein the particular time period corresponds to a transmission time interval, wherein the communication service provided to the first end user device is a voice call communication utilizing a long term evolution protocol, and wherein the non-voice call communication of the second end user device is a data communication.

5. The method of claim 1, wherein the restriction prohibits the equipment of the neighboring sector from utilizing the particular frequency over the particular time period for the voice call communication of the second end user device.

6. The method of claim 1, wherein the restriction limits an amount of power applied by the equipment of the neighboring sector with respect to the particular frequency over the particular time period for the voice call communication of the second end user device.

7. The method of claim 1, wherein the uplink parameters include received signal strength indication data that is received from the equipment of the neighboring sector.

8. The method of claim 1, wherein the serving sector and the neighboring sector are in a same cell site.

9. The method of claim 1, wherein the restriction applied by the equipment of the neighboring sector to the voice call communication of the second end user device is removed responsive to a handover from the serving sector to a second serving sector, and wherein the handover is of a communication service provided to the first end user device.

10. A machine-readable storage device comprising executable instructions that, when executed by a processing system, including a processor, of a serving sector of a wireless network, perform operations comprising:
obtaining uplink parameters from equipment of a neighboring sector of the wireless network, wherein the uplink parameters include measurements associated with uplink transmissions of a first end user device;
determining an uplink differential path loss from one or more transmissions of the first end user device based on the uplink parameters, wherein the one or more transmissions are received by different sectors of the wireless network including the serving sector and the neighboring sector;
selecting a differential path loss threshold from among a group of path loss thresholds according to a type of a communication service for the first end user device; and
responsive to a determination that the uplink differential path loss is less than the differential path loss threshold and accordingly does not satisfy the differential path loss threshold, determining a restriction for utilization by the equipment of the neighboring sector of a particular frequency over a particular time period,
wherein the particular frequency and the particular time period are utilized in providing the communication service to the first end user device,
wherein the equipment of the neighboring sector applies the restriction to a voice call communication of a second end user device without applying the restriction to a non-voice call communication of the second end user device, and
wherein the determination that the uplink differential path loss does not satisfy the differential path loss threshold is performed without utilizing channel quality data from the first end user device.

11. The machine-readable storage device of claim 10, wherein the operations further comprise providing a message to the equipment of the neighboring sector, wherein the message identifies the restriction for the utilization of the particular frequency over the particular time period, and wherein the providing of the message causes the equipment of the neighboring sector to apply the restriction to the voice call communication of the second end user device.

12. The machine-readable storage device of claim 10, wherein the restriction limits an amount of power applied by the equipment of the neighboring sector with respect to the particular frequency over the particular time period for the voice call communication of the second end user device.

13. The machine-readable storage device of claim 10, wherein the restriction prohibits the equipment of the neighboring sector from utilizing the particular frequency over the particular time period for the voice call communication of the second end user device.

14. The machine-readable storage device of claim 10, wherein the restriction for the voice call communication of the second end user device is removed responsive to a second determination that the uplink differential path loss satisfies the differential path loss threshold.

15. The machine-readable storage device of claim 10, wherein the serving sector and the neighboring sector are in different cell sites and wherein the processor comprises a plurality of processors operating in a distributed processing environment.

16. The machine-readable storage device of claim 10, wherein the particular frequency corresponds to a physical resource block, wherein the particular time period corresponds to a transmission time interval, wherein the communication service provided to the first end user device utilizes a long term evolution protocol, and wherein the non-voice call communication of the second end user device is an Internet data communication.

17. A system, comprising:

a processor; and a memory storing executable instructions that, when executed by the processor, perform operations comprising:

obtaining uplink parameters associated with different sectors of a wireless network, wherein the uplink parameters are associated with uplink transmissions of a first end user device, the different sectors including a serving sector for the first end user device and a neighboring sector;

determining an uplink differential path loss from one or more transmissions of the first end user device based on the uplink parameters, wherein the one or more transmissions are received by the different sectors of the wireless network;

selecting a differential path loss threshold from among a group of path loss thresholds according to a type of a communication service for the first end user device;

responsive to a determination that the uplink differential path loss is less than the differential path loss threshold and accordingly does not satisfy the differential path loss threshold, determining a restriction for utilization by equipment of the neighboring sector of a particular frequency over a particular time period;

wherein the particular frequency and the particular time period are utilized by equipment of the serving sector in providing the communication service to the first end user device;

wherein the equipment of the neighboring sector of the different sectors applies the restriction to a first type of communication of a second end user device without applying the restriction to a second type of communication of the second end user device, wherein the first type of communication is of a different type than the second type of communication; and wherein the determination that the uplink differential path loss does not satisfy the differential path loss threshold is performed without utilizing channel quality data from the first end user device.

18. The system of claim 17, wherein the first type of communication of the second end user device is a voice call communication and the second type of communication of the second end user device is a non-voice call communication.

19. The system of claim 18, wherein the operations further comprise providing a message to the equipment of the neighboring sector, wherein the message identifies the restriction for the utilization of the particular frequency over the particular time period, wherein the providing of the message causes the equipment of the neighboring sector to apply the restriction, and wherein the restriction: (a) prohibits the equipment of the neighboring sector from utilizing the particular frequency over the particular time period for the voice call communication of the second end user device, or (b) limits an amount of power applied by the equipment of the neighboring sector with respect to the particular frequency over the particular time period for the voice call communication of the second end user device.

20. The system of claim 17, wherein the serving sector and the neighboring sector are in a same cell site, and wherein the processor comprises a plurality of processors operating in a distributed processing environment.

* * * * *

UNITED STATES PATENT AND TRADEMARK OFFICE
CERTIFICATE OF CORRECTION

Page 1 of 1

PATENT NO. : 10,136,396 B2
APPLICATION NO. : 14/501620
DATED : November 20, 2018
INVENTOR(S) : Brisebois et al.

It is certified that error appears in the above-identified patent and that said Letters Patent is hereby corrected as shown below:

In the Claims

Column 23, Claim 17, Line 1, should read as follows:
17. A system, comprising:
a processor; and
a memory storing executable instructions that, when executed by the processor, perform operations comprising:
    obtaining uplink parameters associated with different sectors of a wireless network, wherein the uplink parameters are associated with uplink transmissions of a first end user device, the different sectors including a serving sector for the first end user device and a neighboring sector;
    determining an uplink differential path loss from one or more transmissions of the first end user device based on the uplink parameters, wherein the one or more transmissions are received by the different sectors of the wireless network;
    selecting a differential path loss threshold associated with uplink transmissions from among a group of path loss thresholds according to a type of a communication service for the first end user device;
    responsive to a determination that the uplink differential path loss is less than the differential path loss threshold and accordingly does not satisfy the differential path loss threshold, determining a restriction for utilization by equipment of the neighboring sector of a particular frequency over a particular time period;
    wherein the particular frequency and the particular time period are utilized by equipment of the serving sector in providing the communication service to the first end user device;
    wherein the equipment of the neighboring sector of the different sectors applies the restriction to a first type of communication of a second end user device without applying the restriction to a second type of communication of the second end user device, wherein the first type of communication is of a different type than the second type of communication; and
    wherein the determination that the uplink differential path loss does not satisfy the differential path loss threshold is performed without utilizing channel quality data from the first end user device.

Signed and Sealed this
Twenty-third Day of February, 2021

Drew Hirshfeld
*Performing the Functions and Duties of the
Under Secretary of Commerce for Intellectual Property and
Director of the United States Patent and Trademark Office*